(12) United States Patent
Edwards

(10) Patent No.: US 8,336,409 B2
(45) Date of Patent: Dec. 25, 2012

(54) MAGNETIC PISTON APPARATUS AND METHOD

(75) Inventor: John W. Edwards, Arcadia, FL (US)

(73) Assignee: Magnamotor, LLC, Arcadia, FL (US)

( * ) Notice: Subject to any disclaimer, the term of this patent is extended or adjusted under 35 U.S.C. 154(b) by 316 days.

(21) Appl. No.: 12/635,282

(22) Filed: Dec. 10, 2009

(65) Prior Publication Data

US 2010/0148610 A1      Jun. 17, 2010

Related U.S. Application Data

(60) Provisional application No. 61/121,651, filed on Dec. 11, 2008.

(51) Int. Cl.
*F16H 21/16*      (2006.01)
*H02K 7/06*       (2006.01)
*H02K 49/10*      (2006.01)
*H02N 11/00*      (2006.01)

(52) U.S. Cl. ............... 74/25; 310/80; 310/103; 310/152

(58) Field of Classification Search ............ 310/80, 310/152, 103
See application file for complete search history.

(56) References Cited

U.S. PATENT DOCUMENTS

| | | |
|---|---|---|
| 1,345,221 A | 6/1920 | Nitka |
| 1,596,468 A | 8/1926 | Wallace |
| 1,640,741 A | 8/1927 | Wallace |
| 3,293,516 A | 12/1966 | G. Maier et al. |
| 3,609,425 A | 9/1971 | Sheridan |
| 3,703,653 A | 11/1972 | Tracy et al. |
| 3,740,597 A * | 6/1973 | Mulasmajic ............... 310/80 |
| 3,831,537 A | 8/1974 | Siegel |
| 3,832,608 A | 8/1974 | Mills |
| 3,899,703 A | 8/1975 | Kinnison |
| 3,939,367 A | 2/1976 | Ramirez |
| 3,949,249 A | 4/1976 | Wiseley et al. |
| 4,011,477 A * | 3/1977 | Scholin ............... 310/80 |
| 4,019,103 A | 4/1977 | Davis et al. |
| 4,187,440 A | 2/1980 | Ulmer |
| 4,196,365 A * | 4/1980 | Presley ............... 310/23 |
| 4,207,773 A | 6/1980 | Stahovic |
| 4,317,058 A | 2/1982 | Blalock |
| 5,219,034 A | 6/1993 | Wortham |
| 5,276,372 A | 1/1994 | Hammer |

(Continued)

FOREIGN PATENT DOCUMENTS

JP      58-69477      *   4/1983

(Continued)

*Primary Examiner* — Burton Mullins
(74) *Attorney, Agent, or Firm* — Allen, Dyer, Doppelt, Milbrath & Gilchrist, P.A

(57) ABSTRACT

A magnetic piston includes a housing having a tapered bore extending along an axis thereof and a piston having a tapered outside wall mating with the tapered bore of the housing for providing radial and longitudinal movement within the tapered bore about a rotational axis of the piston. A shaft is connected to the piston for movement along its longitudinal axis thereof, wherein the axes of the tapered bore and piston are generally aligned along the longitudinal axis. A first set of magnets is embedded within the outside wall of the piston and a second set of magnets is embedded within a surface of a wall forming the bore of the housing. The polarity for each of the magnets within the sets provides attracting and repelling forces causing rotation of the piston relative to the housing and a linear movement of the shaft along the longitudinal axis.

16 Claims, 9 Drawing Sheets

U.S. PATENT DOCUMENTS

| | | | |
|---|---|---|---|
| 5,386,205 A | 1/1995 | Burt et al. | |
| 5,457,349 A | 10/1995 | Gifford | |
| 5,592,036 A | 1/1997 | Pino | |
| 5,637,936 A | 6/1997 | Meador | |
| 5,662,461 A | 9/1997 | Ono | |
| 5,696,413 A | 12/1997 | Woodbridge et al. | |
| 5,757,093 A | 5/1998 | Susliaev et al. | |
| 6,049,146 A | 4/2000 | Takara | |
| 6,433,452 B1 | 8/2002 | Graham | |
| 6,472,778 B2 | 10/2002 | Keller | |
| 6,552,450 B2 | 4/2003 | Harty et al. | |
| 6,729,862 B1 | 5/2004 | Schnabl | |
| 6,851,938 B2 | 2/2005 | Ding et al. | |
| 7,105,958 B1 | 9/2006 | Elmaleh | |
| 7,330,094 B2 | 2/2008 | McCarthy | |
| 7,446,440 B2 | 11/2008 | Mihajlovic | |
| 2002/0121815 A1 | 9/2002 | Sullivan | |
| 2006/0071561 A1 | 4/2006 | Chiu et al. | |
| 2006/0273666 A1 | 12/2006 | Mihajlovic | |
| 2008/0197721 A1 | 8/2008 | Reyes | |

FOREIGN PATENT DOCUMENTS

| | | |
|---|---|---|
| JP | 11168873 | 6/1999 |
| KR | 20060118230 | 11/2006 |

* cited by examiner

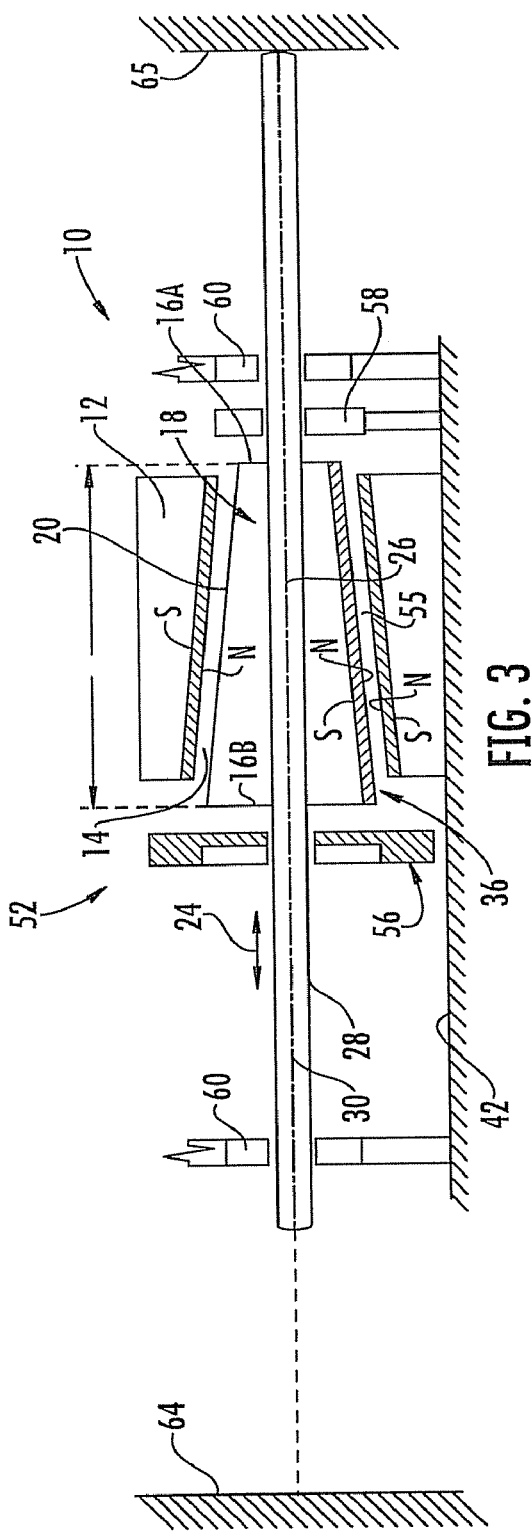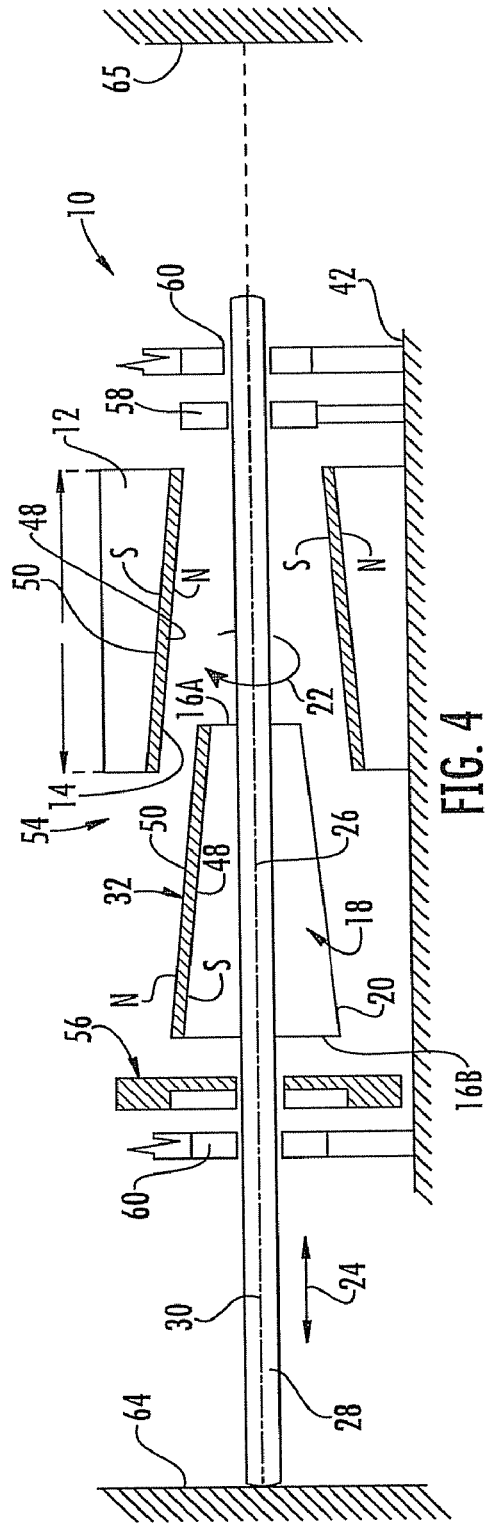

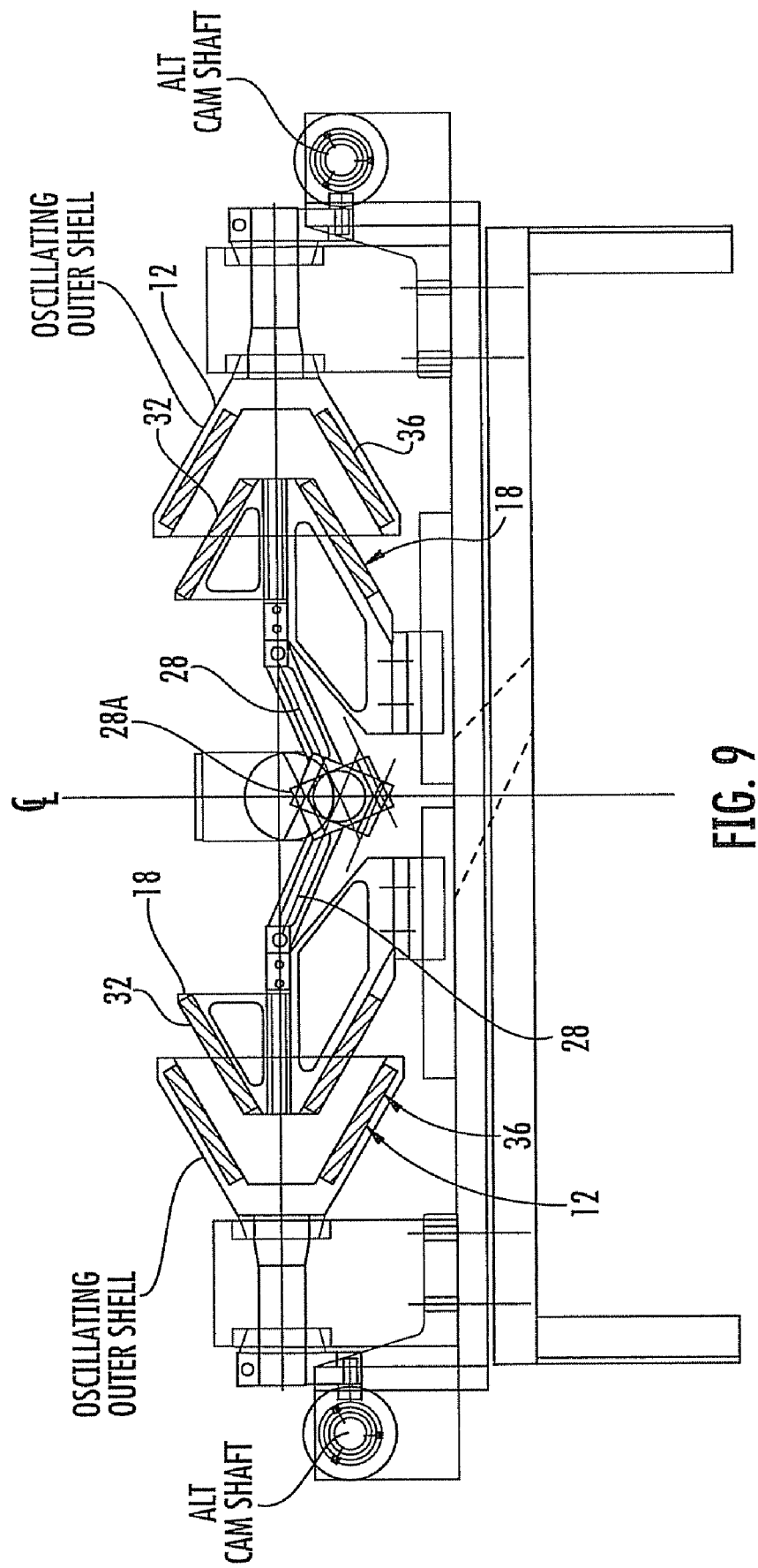

MAGNETIC PISTON APPARATUS AND METHOD

CROSS-REFERENCE TO RELATED APPLICATIONS

This application claims the benefit of U.S. Provisional Application No. 61/121,651, filed Dec. 11, 2008, the disclosure of which is hereby incorporated by reference herein in its entirety, and commonly owned.

FIELD OF INVENTION

The present invention generally relates to devices and methods employing a magnetic field for providing a driving force, and more particularly to use of a magnetic piston employing permanent magnets for converting a rotational motion to a linear motion.

BACKGROUND OF THE INVENTION

The use of a magnetic field to provide a driving force is well known. As described in U.S. Pat. No. 5,386,205 to Burt et al. for a High Impact Electo Press, an electro-magnetically actuated piston includes movable magnetic cores and a rod for providing a punch press. A Vehicle With Magnetic Engine is disclosed in U.S. Pat. No. 5,219,034 to Wortham including a block fitted with multiple cylinder receiving magnetic pistons attached to a crank shaft and electromagnets mounted in the engine head for magnetically operating the magnetic pistons by electric current reversal. While the Burt and Wortham publications employ electromagnetic operating, the use of permanent magnets for converting rotational to linear motions, or visa versa, is also well known. As illustrated by way of example in U.S. Pat. No. 3,899,703 to Kinnison for a Permanent Magnet Motion Conversion Means, a magnetic motor uses stationary magnets arranged with inverse polarity and another permanent magnet alternately movable within the field of the stationary magnets by a diverter, such as a solenoid, to convert a rotational movement to a linear movement.

Even with such extensive use of magnetic fields to do work, there remains a need to provide an efficient means for enhancing operation of well-known machines using magnetic pistons while keeping such means economical and uncomplicated.

SUMMARY OF THE INVENTION

The present invention is directed to enhancing the use of magnetic field devices for providing a driving force from a magnetic piston that employs free energy derived from permanent magnets. One embodiment may comprise a housing having a tapered bore extending therein along an axis thereof and a piston having a tapered outside wall sufficient for mating with the tapered bore of the housing and for radial and longitudinal movements within the tapered bore about a rotational axis of the piston. A shaft may be connected to the piston for movement along a longitudinal axis thereof, wherein the axes of the tapered bore and piston are generally aligned along the longitudinal axis. A first set of magnets may be embedded within the outside wall of the piston, and a second set of magnets may be embedded within a surface of a wall forming the bore of the housing, wherein a polarity for each of the magnets provide an attracting and repelling forces causing rotation of the piston relative to the housing and a linear movement of the shaft along the longitudinal axis.

Yet further, the invention may be described as a magnetic piston having a tapered outside wall construction for movement within a housing having a bore therein, which bore comprises a tapered construction for mating with the piston outside wall. Multiple elongate permanent magnets are embedded within the outside wall of the piston and within the bore wall of the housing. The elongate magnets extend generally longitudinally along a linear movement axis of the piston.

The permanent magnets within the housing bore wall may have twice the number as in the piston outside wall, may have an equal number, and alternatively a combination for providing repelling and attracting forces as may be desired to suit the piston and housing combination and piston to piston cooperating combinations. The magnets within the piston outside wall may all be of a single polarity extending outward, while the magnets within the bore wall alternate in polarity. As a result, the piston rotates with respect to the housing to induce the opposing magnetic field forces to results in a reciprocating linear motion of the piston. Yet further, the piston may be fixed with the housing rotating, the shaft may rotate within the piston, and there may be a combination thereof while remaining within the teachings of the present invention.

BRIEF DESCRIPTION OF DRAWINGS

For a fuller understanding of the invention, reference is made to the following detailed description, taken in connection with the accompanying drawings and photos illustrating embodiments of the present invention, in which;

FIGS. 3 and 4 are diagrammatical illustrations of one embodiment of an apparatus illustrating an engaged piston position and a disengaged piston position, respectively, for an in-position and out-position of the piston relative to the housing;

FIG. 9 is a diagrammatical end view of the apparatus of FIG. 8; and

DETAILED DESCRIPTION OF EMBODIMENTS

Figure 1:
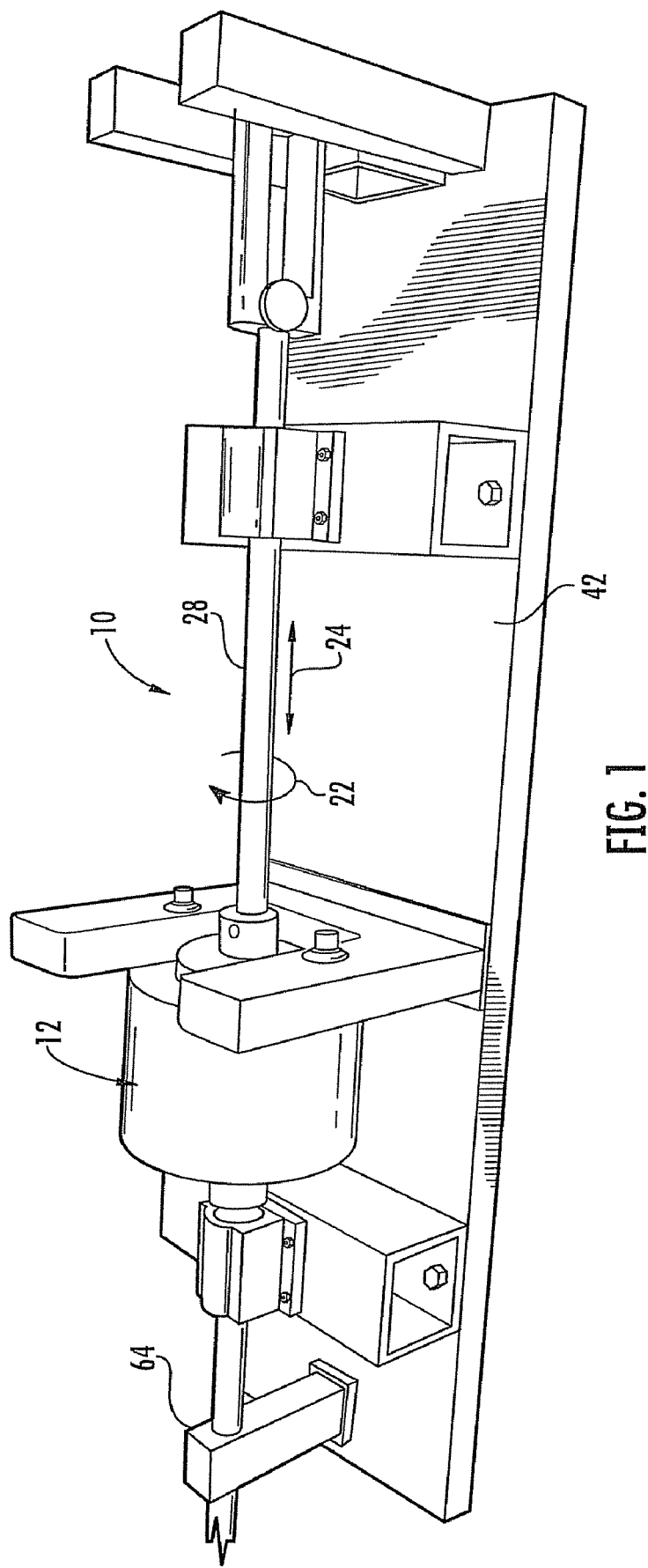
FIG. 1 is a side perspective view of one embodiment of the invention herein illustrated by way of example in a prototype apparatus in keeping with the teachings of the present invention.
Figure 2:
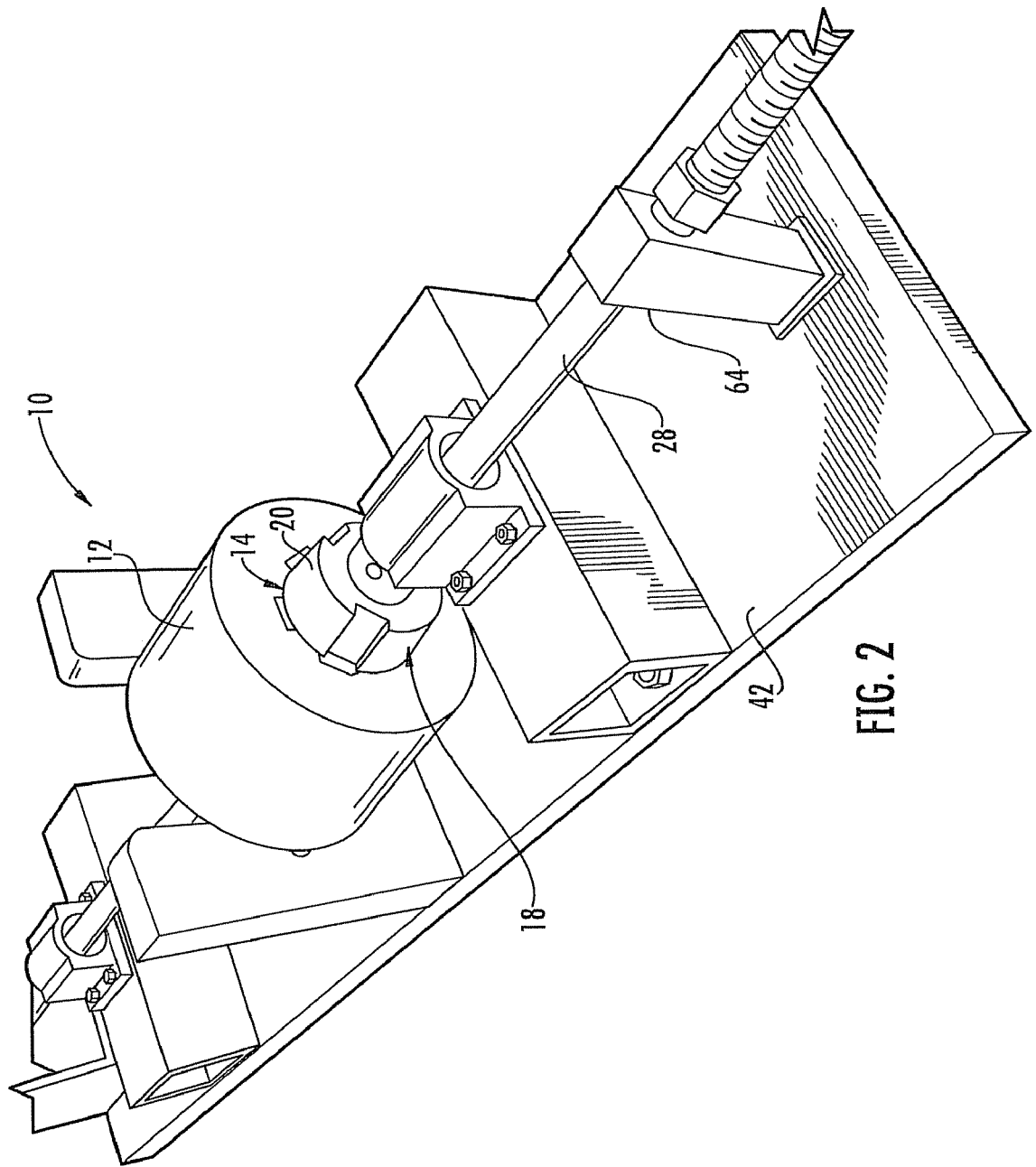
FIG. 2 is a rear perspective view of the apparatus of FIG. 1.

The present invention will now be described more fully with reference to the accompanying photos and drawings in which alternate embodiments of the invention are shown and described. It is to be understood that the invention may be embodied in many different forms and should not be construed as limited to the illustrated embodiments set forth herein. Rather, these embodiments are provided so that this disclosure may be thorough and complete, and will convey the scope of the invention to those skilled in the art.

With reference initially to FIGS. 1-4, one apparatus 10 according to the teachings of the present invention comprises a housing 12 having a tapered bore 14 extending into the housing along an axis 16 of the bore. For the embodiment herein described by way of one example, the bore 14 extends through the housing 16. A piston 18 includes a tapered outside wall 20 for mating with the tapered bore 14 of the housing 12 and for allowing both radial 22 and longitudinal 24 movement within the tapered bore about a rotational axis 26 of the piston. A shaft 28 is connected to the piston 18 for movement along a longitudinal axis 30 of the shaft. The axes 16, 26 of the tapered bore 14 and the piston 18 are aligned along the longitudinal axis 30 of the shaft 28.

Figure 5:
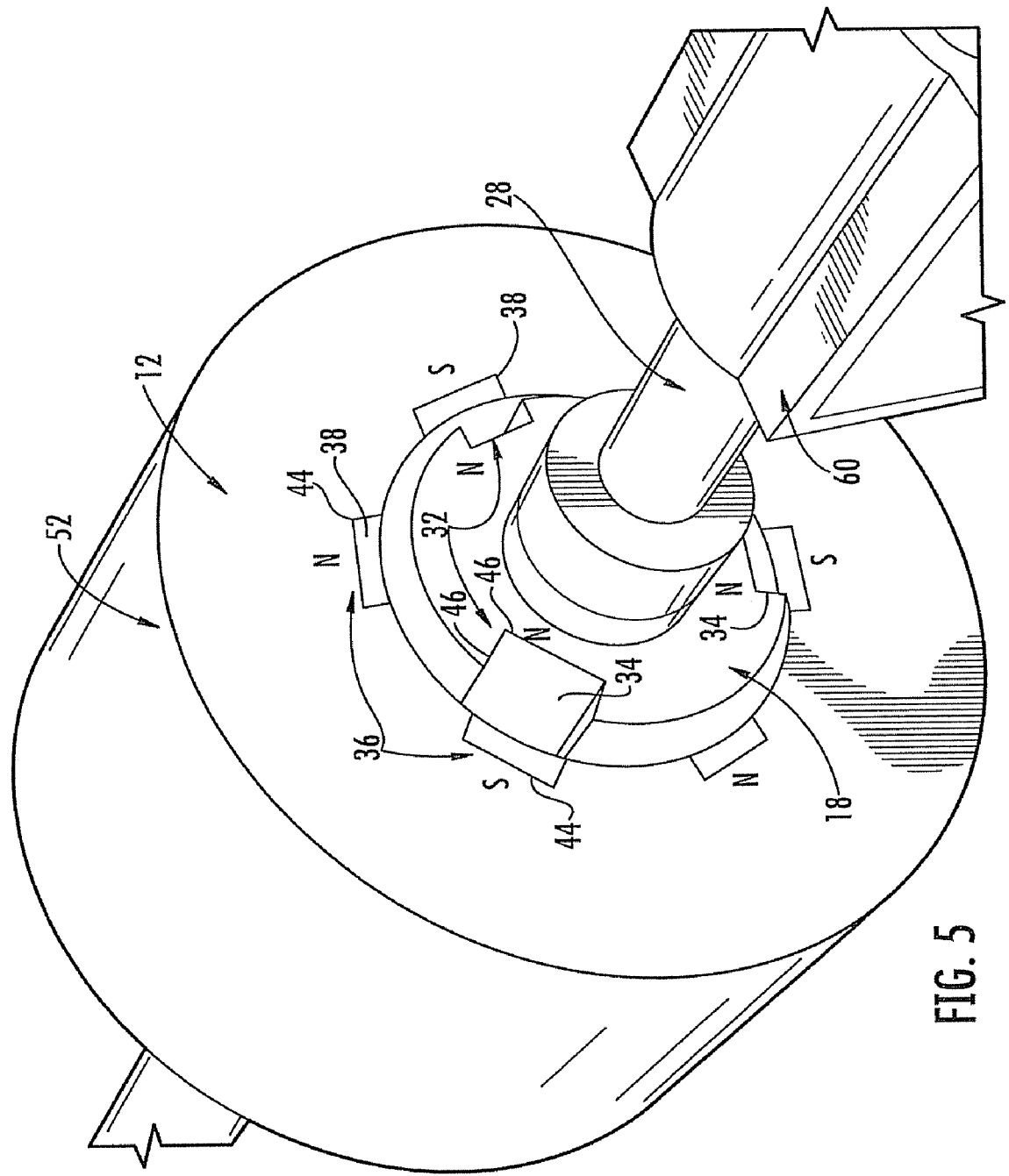
FIG. 5 is a rear perspective view of a housing and piston portion of the apparatus of FIG. 1, wherein the piston is illustrated for the engaged position.
Figure 6A:
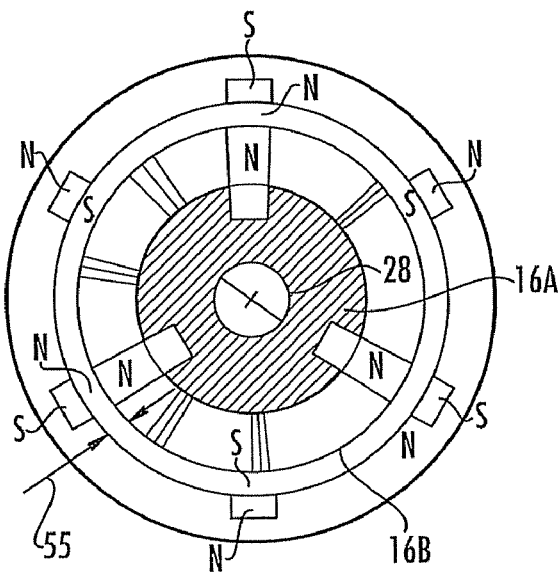
FIG. 6A is a diagrammatical illustration of the piston and its magnets relative to the housing and its magnets for one embodiment of the invention.
Figure 6:
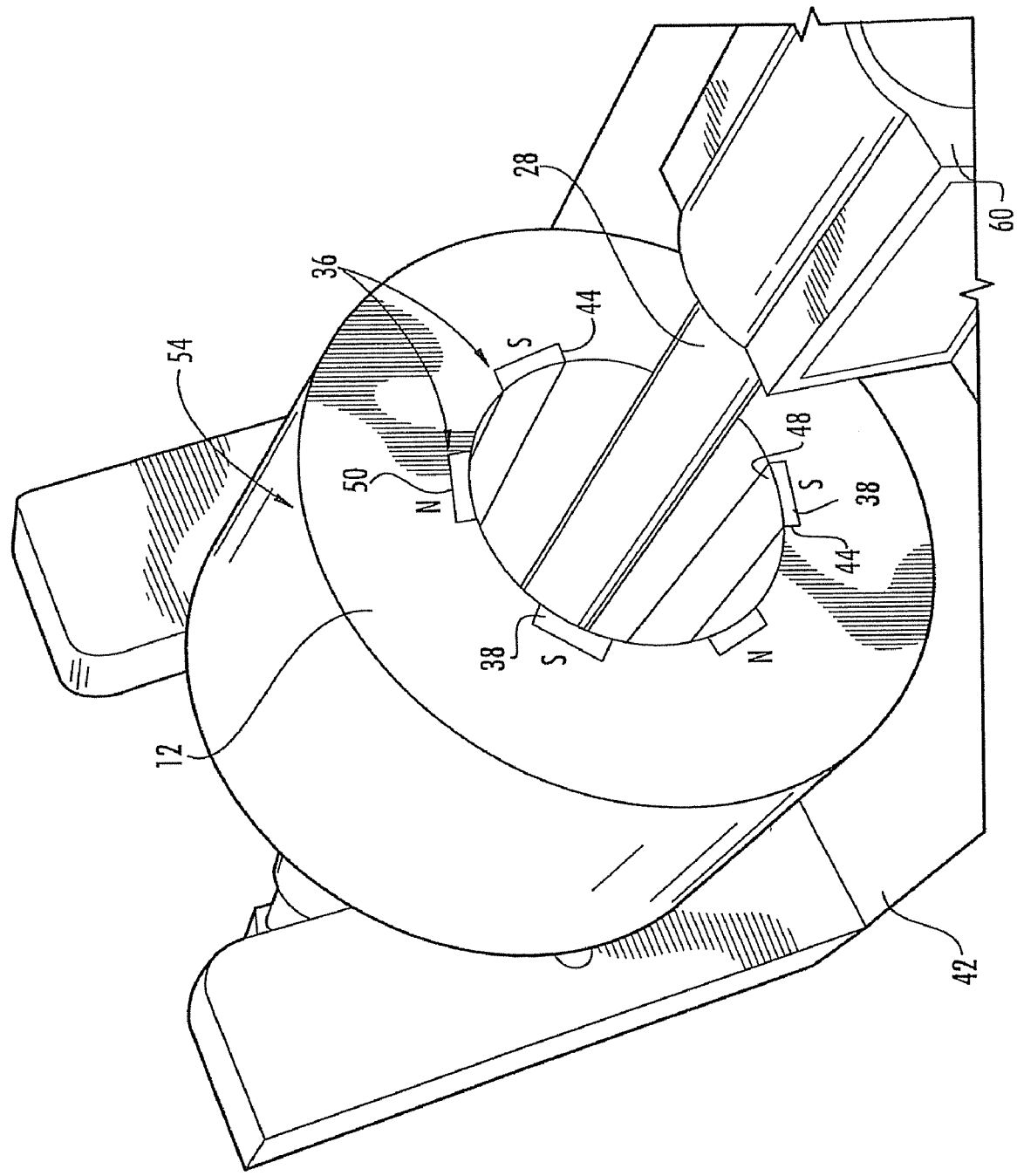
FIG. 6 is a rear perspective view of the apparatus of FIG. 1, wherein the piston is illustrated for the disengaged position.

With continued reference to FIGS. 3 and 4, and now with reference to FIGS. 5 and 6, a first set 32 of magnets 34 is embedded within the tapered outside wall 20 of the piston 18, and a second set 36 of magnets 38 is embedded within a wall surface 40 forming the bore 14 of the housing 12. A polarity (north (N) and south (S)) for each of the magnets 34, 38 provides attracting and repelling forces causing rotation of the piston 18 relative to the housing 12 and the linear longitudinal movement 24 of the shaft 28 along the longitudinal axis 30.

Figure 7:
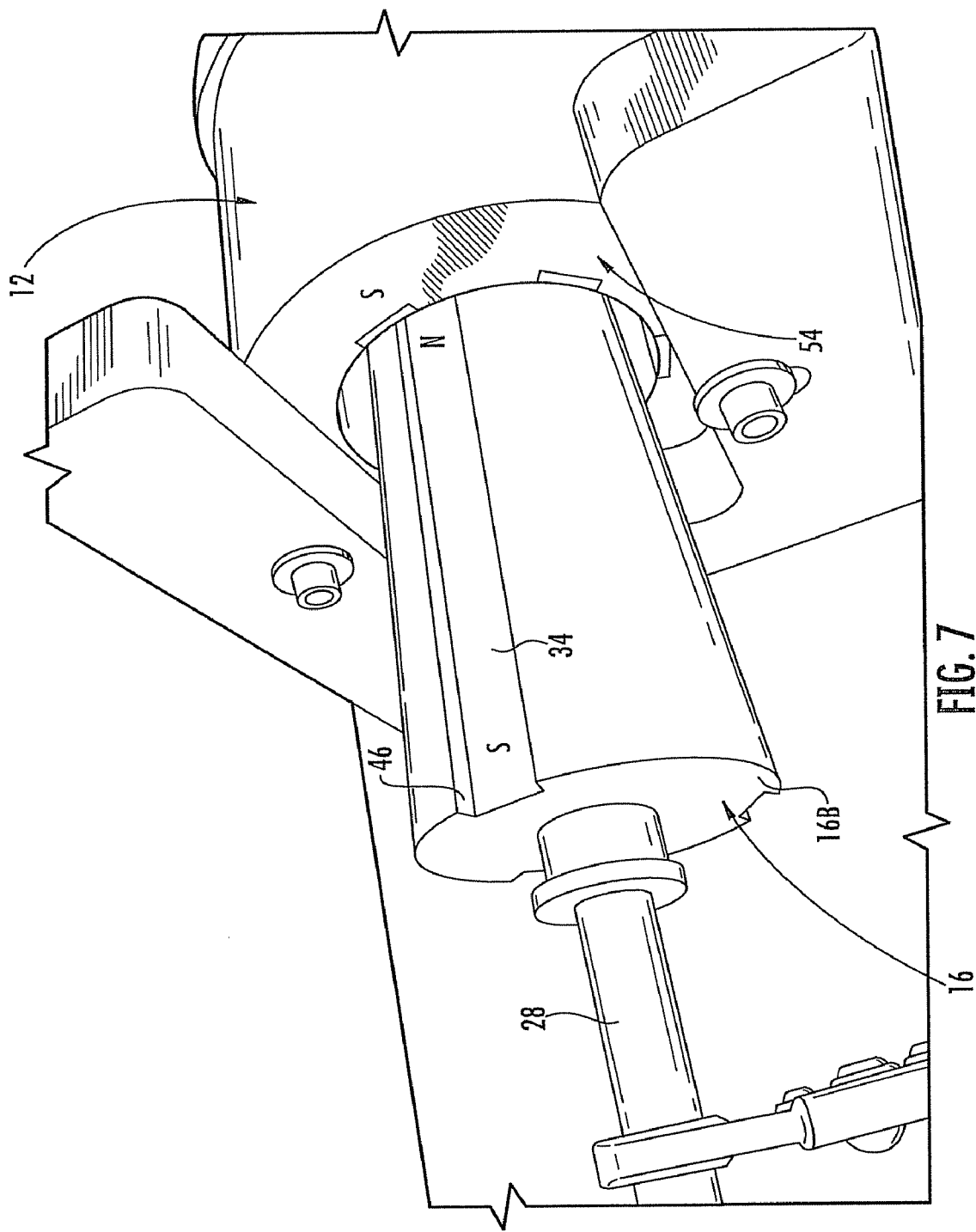
FIG. 7 is a front and side perspective view of the housing and piston portion of the apparatus of FIG. 1, wherein the piston is illustrated for the disengaged position.

With continued reference to FIGS. 1-4, the apparatus 10 herein described comprises a base 42, wherein the housing 12 is affixed to the base, and wherein the piston 18 rotates within the housing. It will come to the minds of those skilled in the art, now having the benefit of the teachings of the present invention, that alternate apparatus may comprise the housing 12 rotating about a fixed piston 18. With reference again to FIGS. 5 and 6, and now to FIG. 7, the apparatus 10 herein described by way of example includes the magnets 34, 38 constructed as elongate permanent magnets extending along the longitudinal axis. Yet further, the magnets 34, 38 comprise rare earth magnets integrally formed within a plurality of grooves 44, 46 in the housing bore wall 40 and the piston outside wall 20.

For the embodiment herein described, the rare earth magnets 34, 38 are fitted within the grooves 44, 46 within the bore wall 40 and the piston outside wall 20, and the polarity of each is set on the elongate sides of the magnets, inner radial side 48 and outer radial side 50. As will come to the mind of those skilled in the art, the rare earth magnets may be integrally formed within the structures of the piston, housing and or a combination thereof. Yet further, alternate configurations of magnets may be employed without departing from the teachings of the present invention.

By way of example for the embodiment herein described, there are twice as many permanent magnets 34 within the housing bore wall 40 as there are within the piston outside wall 20.

By way of further example for alternate magnet configurations, one embodiment may comprise the magnets 34 within the piston outside wall 20 all of a single polarity extending radially outward, while the magnets 38 within the bore wall 40 alternating in polarity so as to induce opposing magnetic field forces to cause rotation of the piston 18 relative to the housing 12 and a linear motion 24 of the shaft 28 along its longitudinal axis 30, such as a movement from an engaged piston position 52 illustrated with reference again to FIG. 3 to a disengaged piston position 54 as illustrated with reference again to FIG. 4. Alternatively, the magnets within the bore wall may all have a single polarity extending radially outward, while the magnets within the piston outside wall alternate in polarity so as to induce opposing magnetic field forces to cause a linear motion of the shaft.

Figure 8:
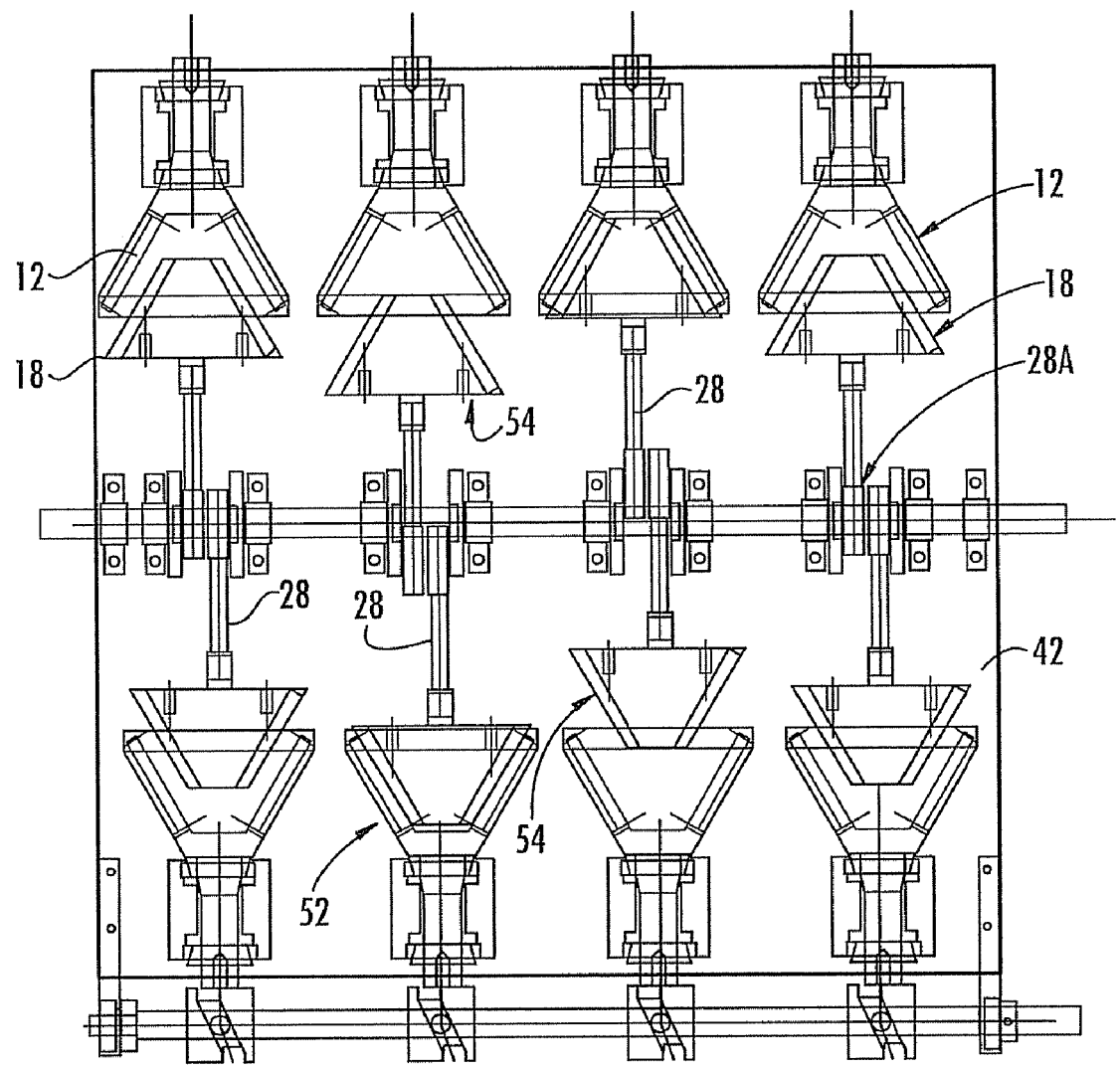
FIG. 8 is a diagrammatical plan view illustrating one embodiment of a multi magnetic piston motor using the tapered piston and housing bore.

The rotation of the outer cone shape of the tapered piston may emulate a valve train of a typical combustion engine having a camshaft. The alternating forces acting on the cone shaped piston 16 create a linear force and the shaft is used to convert to a rotary motion to a linear motion. By way of example of one use, the tapered, truncated cone shaped, piston attached to the shaft 28 may be connected to a cam and connecting rod 8A, such as illustrated with reference to FIG. 8. Yet further and as above described, embodiments of the invention may comprise the housing 12 rotating or oscillating about the piston 18. Yet further, the housing 12, the piston 18 and the shaft 28 may rotate in any combination without departing from the teachings of the present invention, as illustrated with reference to FIG. 9.

The alternating forces acting on the cone piston creating the linear force with the crankshaft used to convert the linear motion to a rotary motion. The piston may be attached to the crankshaft via a cam. Without departing from the teachings of the present invention, there may be any combination of magnets within the bore wall and piston outside wall, and rotation of the piston with respect to the housing between selected combination of magnets to provide the driving forces as above presented for the embodiment ad prototype herein presented by way of example only.

Figure 5A:
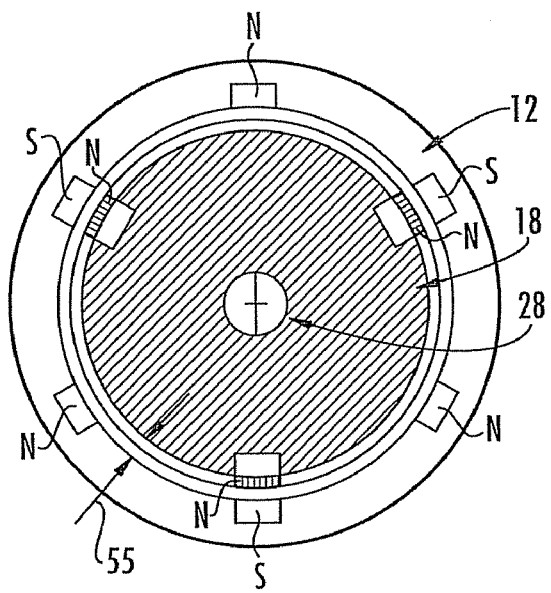
FIG. 5A is a diagrammatical illustration of the piston and its magnets relative to the housing and its magnets for one embodiment of the invention.

For embodiments developed to date, and as illustrated with reference again to FIG. 3, it has been found that operation of a prototype is improved when the length of the piston is greater than the length of the housing receptacle bore for the purpose of enhancing the magnetic forces on the piston. As illustrated with reference again to FIGS. 3 and 4, the cone shaped piston 18 may be oriented in either direction having its smaller end 16A in the front or in the rear of the apparatus, with the housing bore adjusted accordingly. Yet further, and as illustrated with reference to FIGS. 5A and 6A, the size of the spacing between the bore wall and the outside piston wall, a gap 55) affects the driving forces created and does the stroke (linear distance of travel) of the piston. The utilization of the cone shape piston allows an increase stroke as the magnet engages the housing receptacle cone shaped bore. The use of the cone piston and receptacle cone increases the area available for attaching more than one magnet. As above described, the magnets are attached to the piston cone and the receptacle cone by recessed grooves. The depth may be additionally used to control minimum clearance between the inner and outer magnets.

Figure 10:
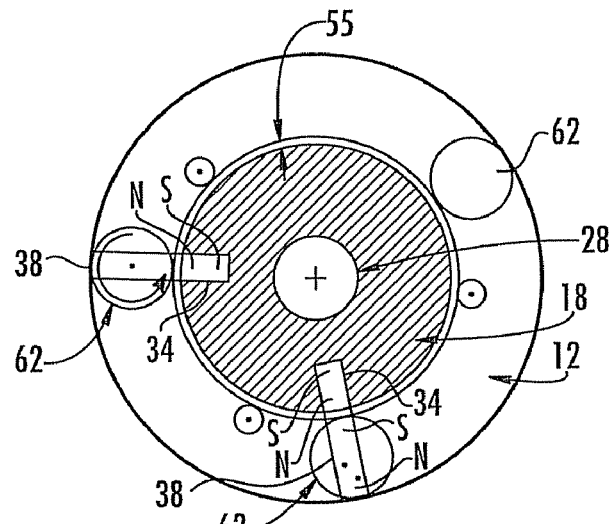
FIG. 10 is a partial diagrammatical view of an alternate housing and piston embodiment illustrating an alternate permanent magnet configuration.

As illustrated with reference again to FIGS. 3 and 4, a flywheel 56 may be used to maintain the inertia and facilitate radial movement of the shaft 28, and thus the piston 18 for the embodiment herein described by way of example. Yet further, the rotation or linear movement of the shaft or piston may include a power assist device 58, and may include a use of a single direction bearing 60. The use of the single direction bearing 60 is consistent with the rotational forces created in one direction (e.g. piston driven outward of the housing) has been seen to be greater than the force driving the piston into the housing. Imbedding the magnets 34, 38 may take alternate forms as illustrated with reference to FIG. 10 wherein N-S pole magnets are imbedded is a rotational holder 62 for aligning as above described.

By way of further example, and as illustrated with reference again to FIGS. 1-4, the apparatus may be employed as a high impact press, wherein a slight rotation of the piston results in a strong linear driving force of the shaft into a stop 64, or in an opposite direction to stop 65.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and alternate embodiments are intended to be included within the scope of the claims supported by this specification.

That which is claimed:

1. An apparatus comprising:
   a housing having a tapered bore extending therein along an axis thereof;
   a piston having a tapered outside wall sufficient for mating with the tapered bore of the housing and for radial and longitudinal movements within the tapered bore about a rotational axis of the piston;
   a shaft connected to the piston for movement along a longitudinal axis thereof, wherein the axes of the tapered bore and piston are generally aligned along the longitudinal axis; and
   a first set of magnets embedded within the outside wall of the piston; and a second set of magnets embedded within a surface of a wall forming the bore of the housing, wherein a polarity for each of the magnets provide an attracting and repelling forces causing rotation of the piston relative to the housing and a linear movement of the shaft along the longitudinal axis; and
   a power assist operable with the shaft for providing a rotary motion thereto;
   wherein a longitudinal length of the piston is sufficiently greater than a longitudinal length of the housing proximate the bore for enhancing the magnetic forces imposed on the magnets of the piston by the magnets within the housing.

2. The apparatus according to claim 1, wherein the magnets extend generally along the longitudinal axis.

3. The apparatus according to claim 1, wherein the magnets are elongate permanent magnets.

4. The apparatus according to claim 1, wherein the tapered piston and bore comprise a cone shape.

5. The apparatus according to claim 1, wherein a gap is formed between the bore wall and the outside piston wall, and wherein a modification of a dimension for the gap is modified to affect driving forces created for a stroke of the piston.

6. The apparatus according to claim 1, wherein a plurality of grooves is formed within the piston outside wall and the bore wall, and wherein the magnets are carried within the grooves.

7. The apparatus according to claim 1, further comprising a fly wheel carried by the shaft, the fly wheel useful in maintaining an inertia and facilitating movement of the piston.

8. The apparatus according to claim 1, further comprising a bearing operable with the shaft.

9. The apparatus according to claim 1, wherein the magnets comprise rare earth magnets integrally formed within the piston and the housing.

10. The apparatus according to claim 1, wherein the bore wall of the housing comprises twice the amount of magnets extending longitudinally therein as the number of magnets in the piston outside wall.

11. The apparatus according to claim 1, wherein the shaft is operable with a cam and connecting rod of a motor.

12. The apparatus according to claim 1, further comprising a base, wherein the housing is affixed to the base, and wherein the piston rotates within the housing.

13. An apparatus comprising:
    a housing having a tapered bore extending therein along an axis thereof;
    a piston having a tapered outside wall sufficient for mating with the tapered bore of the housing and for radial and longitudinal movements within the tapered bore about a rotational axis of the piston;
    a shaft connected to the piston for movement along a longitudinal axis thereof, wherein the axes of the tapered bore and piston are generally aligned along the longitudinal axis; and
    a first set of magnets embedded within the outside wall of the piston; and a second set of magnets embedded within a surface of a wall forming the bore of the housing, wherein a polarity for each of the magnets provide an attracting and repelling forces causing rotation of the piston relative to the housing and a linear movement of the shaft along the longitudinal axis; and
    a power assist operable with the shaft for providing a rotary motion thereto;
    wherein the magnets within the piston outside wall are all of a single polarity extending radially outward, while the magnets within the bore wall alternate in polarity so as to cause at least one of the housing and the piston to rotate and induce opposing magnetic field forces to cause a linear motion of the shaft along the longitudinal axis.

14. An apparatus comprising:
    a housing having a tapered bore extending therein along an axis thereof;
    a piston having a tapered outside wall sufficient for mating with the tapered bore of the housing and for radial and longitudinal movements within the tapered bore about a rotational axis of the piston;
    a shaft connected to the piston for movement along a longitudinal axis thereof, wherein the axes of the tapered bore and piston are generally aligned along the longitudinal axis; and
    a first set of magnets embedded within the outside wall of the piston; and a second set of magnets embedded within a surface of a wall forming the bore of the housing, wherein a polarity for each of the magnets provide an attracting and repelling forces causing rotation of the piston relative to the housing and a linear movement of the shaft along the longitudinal axis; and
    a power assist operable with the shaft for providing a rotary motion thereto;
    wherein the magnets within the bore wall are all of a single polarity extending radially outward, while the magnets within the piston outside wall alternate in polarity so as to cause at least one of the housing and the piston to rotate and induce opposing magnetic field forces to cause a linear motion of the shaft along the longitudinal axis.

15. An apparatus comprising:
    a housing having a tapered bore extending therein along an axis thereof;
    a piston having a tapered outside wall sufficient for mating with the tapered bore of the housing and for radial and longitudinal movements within the tapered bore about a rotational axis of the piston;
    a shaft connected to the piston for movement along a longitudinal axis thereof, wherein the axes of the tapered bore and piston are generally aligned along the longitudinal axis;

a first set of magnets embedded within the outside wall of the piston; and a second set of magnets embedded within a surface of a wall forming the bore of the housing, wherein a polarity for each of the magnets provide an attracting and repelling forces causing rotation of the piston relative to the housing and a linear movement of the shaft along the longitudinal axis; and further comprising a bearing operable with the shaft and a power assist operable with the shaft for providing a rotary motion thereto;

wherein the bearing comprises a single direction bearing configured to limit rotation of the shaft consistent with rotational forces created by the piston.

16. An apparatus comprising:

a housing having a tapered bore extending therein along an axis thereof;

a piston having a tapered outside wall sufficient for mating with the tapered bore of the housing and for radial and longitudinal movements within the tapered bore about a rotational axis of the piston;

a shaft connected to the piston for movement along a longitudinal axis thereof, wherein the axes of the tapered bore and piston are generally aligned along the longitudinal axis; and a first set of magnets embedded within the outside wall of the piston; and a second set of magnets embedded within a surface of a wall forming the bore of the housing, wherein a polarity for each of the magnets provide an attracting and repelling forces causing rotation of the piston relative to the housing and a linear movement of the shaft along the longitudinal axis; and a power assist operable with the shaft for providing a rotary motion thereto:

wherein the shaft extends fully through the piston and housing, the apparatus further comprising opposing first and second stops positioned for receiving opposing first and second ends of the shaft, wherein a slight rotation of the piston results in a linear driving force of the shaft form the first stop into the second stop.

* * * * *